E. J. LELAND.

Improvement in Galvanic Batteries.

No. 120,651. Patented Nov. 7, 1871.

UNITED STATES PATENT OFFICE.

EDWIN J. LELAND, OF WORCESTER, MASSACHUSETTS.

IMPROVEMENT IN GALVANIC BATTERIES.

Specification forming part of Letters Patent No. 120,651, dated November 7, 1871.

*To all whom it may concern:*

Figure 1:
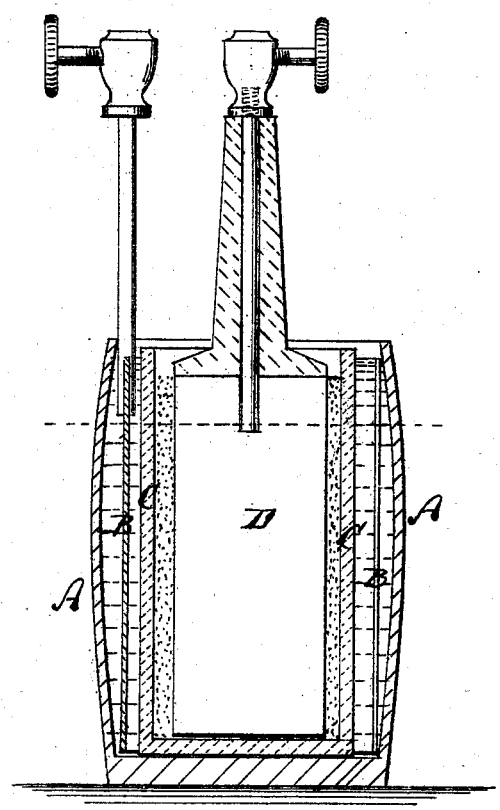
Figure 3:
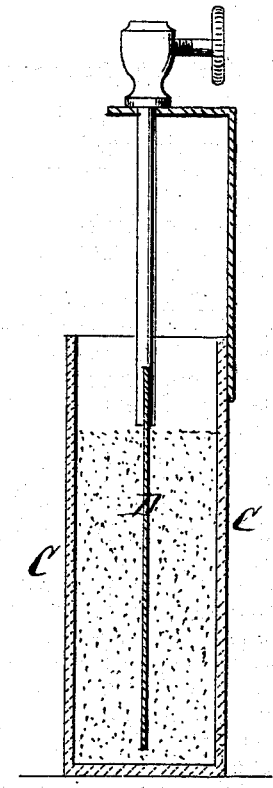
Figure 2:
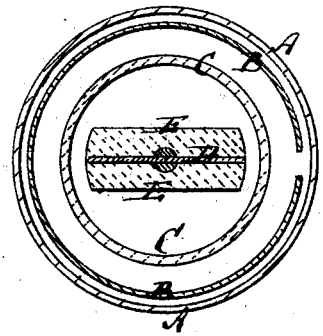

Be it known that I, EDWIN J. LELAND, of Worcester, in the county of Worcester and State of Massachusetts, have invented a new and Improved Electric Battery, of which the following is a specification:

Figure 1 represents a vertical central section of my improved electric battery. Fig. 2 is a horizontal section of the same. Fig. 3 is a detail side view of the inner platinum element.

Similar letters of reference indicate corresponding parts.

This invention has for its object to produce an electric battery which will operate continuously without requiring attention as long as it remains provided with the requisite exciting substances. The invention consists in placing within the porous cup containing the platinum element sulphate of mercury alone, or mixed with black oxide of manganese, and in surrounding said cup with water, which is in contact with the zinc. This combination produces reliable action, and is very economical, as the spent sulphate of mercury falls to the bottom of the cup in shape to be readily reconverted.

A in the drawing represents the glass tumbler or outer vessel of the battery. B is the zinc placed therein; C, the porous or carbon cup within the zinc. Into the cup is placed the plate D of the platinum, either alone, as in Fig. 3, if said cup is carbon, or if porous, held between two cheeks, E E, of carbon, as in Figs. 1 and 2. The cup is filled with sulphate of mercury, which is mixed with some black oxide of manganese. The jar or vessel A is filled with water, containing, possibly, a few drops of sulphuric acid.

By connecting the poles of the platinum and zinc plates a steady action is maintained until the sulphate of mercury is entirely decomposed and falls to the bottom of the cup as metallic mercury, ready to be reconverted into sulphate of mercury. This insures great economy.

This battery will work weeks or months without attention, except perhaps the filling up of evaporated water, and the supply of sulphate of mercury. No acid being required offensive fumes are avoided, and much steadier action is insured.

Having thus described my invention, I claim as new and desire to secure by Letters Patent—

The combination of the vessel A, zinc B, porous or carbon cup C, and platinum D, with the sulphate of mercury within the cup, all operating substantially as herein shown and described.

EDWIN J. LELAND.

Witnesses:
CHAUNCEY G. HARRINGTON,
EDWIN A. KELLEY.

(50)